INVENTOR
M. C. RICHARDSON
BY E. B. Birkenbeul
ATTORNEY

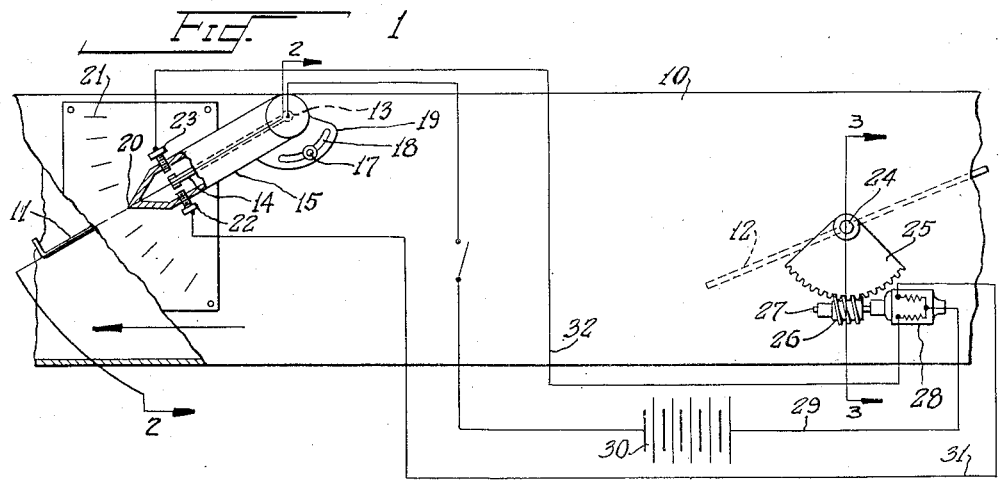
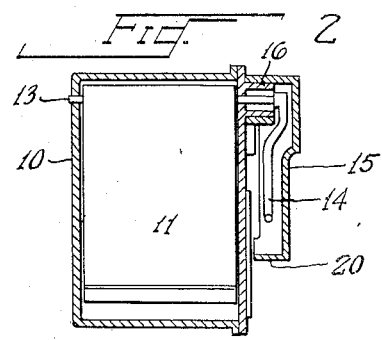
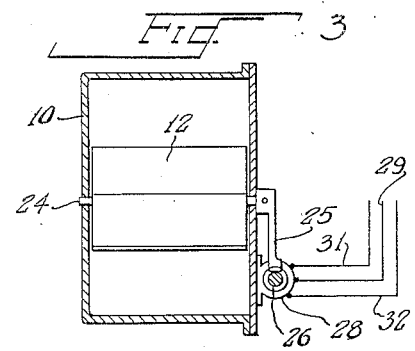
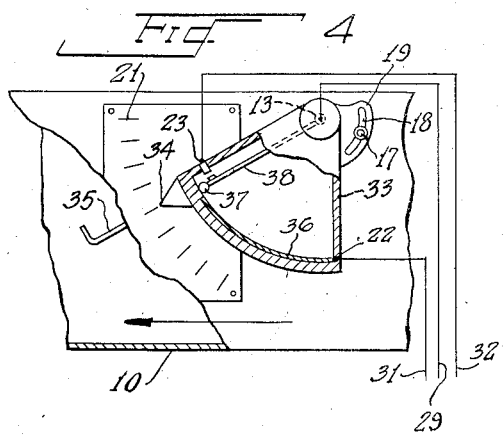
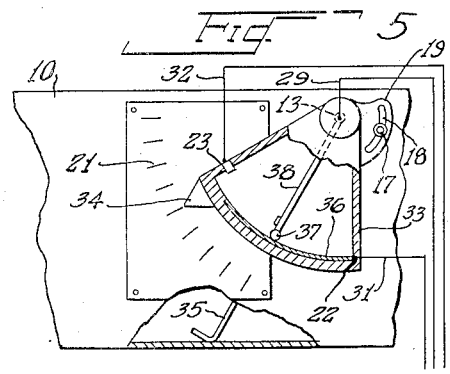

Patented May 10, 1938

2,116,912

UNITED STATES PATENT OFFICE 2,116,912

AIR FLOW PILOT CONTROL

Max C. Richardson, Portland, Oreg., assignor to Iron Fireman Manufacturing Company, Portland, Oreg.

Application September 21, 1931, Serial No. 564,014

16 Claims. (Cl. 110—69)

This invention relates generally to coal burning stokers, and particularly to an air flow pilot control.

The main object of this invention is to make the flow of air delivered by a coal burning stoker self regulated.

The second object is to more closely approach the ideal condition in coal burning by automatically governing the quantity of air delivered with the fuel and to make it possible to vary the governing action.

The third object is to make it possible to set an indicator for a desired air flow and to maintain this flow within extremely narrow limits.

These, and other objects, will become more apparent from the specification following as illustrated in the accompanying drawings, in which:

Fig. 1 is a somewhat diagrammatic view of one form of the device.

Fig. 2 is a section taken along the line 2—2 in Fig. 1.

Fig. 3 is a section taken along the line 3—3 in Fig. 1.

Fig. 4 is a fragmentary section through a modified form of the device showing the stoker operating position of the control.

Fig. 5 is a view similar to Fig. 4 but showing a condition which will render the stoker inoperative.

Similar numbers of reference refer to similar parts throughout the several views.

Figure 6:
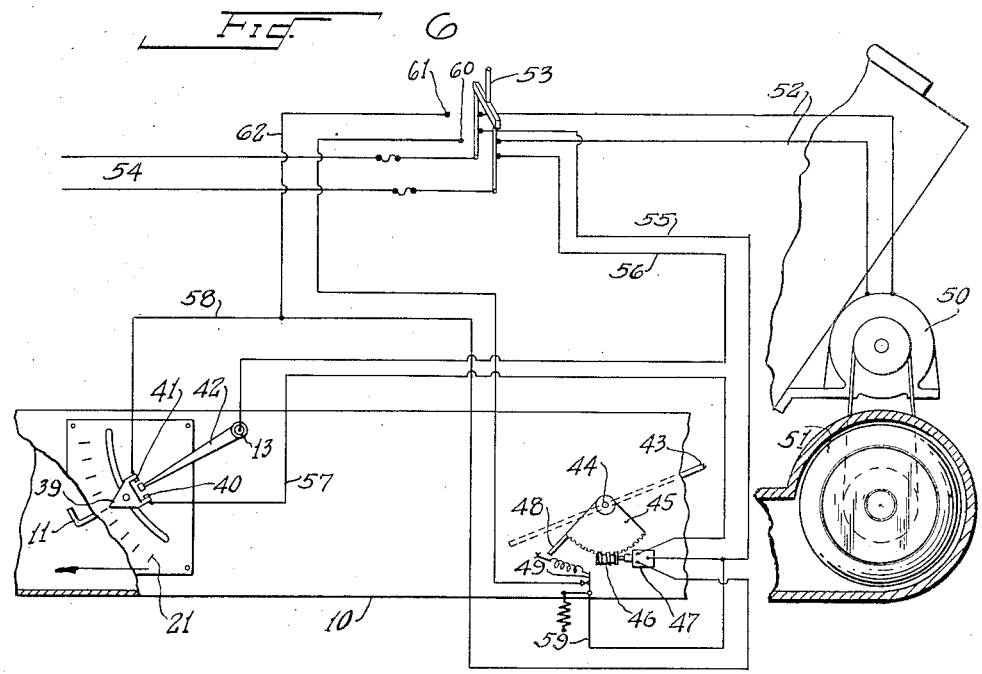
Fig. 6 is a diagrammatic view of another modification.

Before entering into a description of this device attention is drawn to my copending application Serial No. 558,726, over which this is an improvement.

Referring in detail to the drawings, there is shown in Fig. 1 the air duct 10 of an underfeed stoker within which is hingedly mounted what, for the sake of convenience, is referred to as a pilot damper 11. The function of this damper is simply to control the action of a controlling or regulating damper 12, which is preferably of the balance type and is also mounted in the air duct 10.

The pilot damper 11 is mounted on a transverse shaft 13 on the outer end of which is secured a contact arm 14. Around the contact arm 14 is placed a hollow indicator arm 15 adapted to swing on the projecting hub 16 which forms a part of the air duct 10. The indicator arm 15 may be held in any desired position by means of a clamping screw 17 which passes through a slot 18 in a segment 19 formed on the side of the arm 15. The arm 15 is provided with a pointed end 20 which may be set at any one of the various positions along the graduated scale 21 and held there by means of the clamping screw 17. Contact screws 22 and 23 are mounted in the arm 15, and the contact arm 14 is free to float between the adjacent ends of the screws 22 and 23.

The controlling damper 12 is mounted on a shaft 24 which, in this instance, has secured thereon a segment gear 25 which meshes with a worm 26 on the shaft 27 of a reversible motor 28, one of whose leads 29 passes through a source of power 30 to the contact arm 14. A second lead 31 extends from one side of the motor 28 to the contact screw 22. A third lead 32 extends from the remaining motor terminal to the contact screw 23. It will be understood that the screws 22 and 23 are insulated from the arm 14 by insulator bushings (not shown).

The operation of this form of the device is as follows: Assuming that the indicator point 20 has been set to a desired position on the scale 21 and held there by the screw 17, it will be seen that the weight of the pilot damper 11 will cause same to drop until the contact arm 14 engages the screw 22, provided an insufficient amount of air is flowing through the duct 10. This causes current to flow through the wires 29 and 31 and drive the motor 28 in a direction which will cause the damper 12 to open—that is approach, in this instance, a horizontal position and thereby reduce the amount of restriction offered to the flow of air. This will naturally permit an increase in the flow of air through the duct 10, and the pilot damper 11 which is actuated by this flow of air, will now rise and carry the arm 14 out of engagement with the screw 22. On the other hand, if the amount of air flowing through the duct 10 exceeds the value indicated by the pointer 20 then the pilot damper 11 will rise sufficiently to cause the arm 14 to engage the screw 23 causing current to flow through the wires 29 and 32, thereby reversing the motor 28 and moving the damper 12 toward an inclined or closed position.

In the form of the device shown in Figs. 4 and 5 the indicator arm 33 is in the form of a hollow segment, provided with a single point 34, which can be set at any of the graduations on the scale 21. The damper 35, in this instance, is capable of functioning as a banking damper, due to the fact that when the flow of air ceases in the duct 10 the damper 35 can fall to the closed position shown in Fig. 5. This is accomplished by providing an arcuate contact strip 36 within the arm 33 along which a brush 37 of the contact arm 38 may ride thereby maintaining a closed circuit through the wires 29 and 31 during the closing of the damper 35 with the same action on the damper 12 as is produced by the contacts 14 and 22 in Fig. 1.

In the form of the device shown in Fig. 6 there is illustrated the pilot damper 11 within the duct 10 and an adjustable indicator point 39 having contacts 40 and 41 mounted thereon between which may float the contact arm 42, which is directly connected to the pilot damper 11. The damper 43, in this instance, differs slightly from the damper 12 shown in Fig. 1 in that it also serves as a banking damper. The function of a banking damper is to limit or stop the air flow through the air duct 10 when the stoker is not being operated, and in this way to reduce to a minimum the amount of burning of coal which would occur when the stoker is not in operation or when the fire is in the condition called "banked."

On the shaft 44 of the damper 43 is a segment gear 45 which meshes with a worm 46 on the shaft of a reversible motor 47. The segment 45 has a switch-operating arm 48 at one end thereof, which arm is adapted to engage the spring closed switch 49 and open same whenever the segment 45 is moved sufficiently in a closing direction to permit the damper 43 to serve as a banking damper. There is also indicated a stoker motor 50 and a fan 51 which delivers air to the air duct 10 and which is operated from the motor 50. The fan and motor are shown at a much reduced scale.

For the sake of simplifying the illustration the motor leads 52 are carried directly to a double throw knife switch 53 which is located in the power line 54. From one side of the knife switch 53 extends a lead wire 55 which connects with the neutral terminal of the motor 47. On the opposite side of the switch 53 extends a lead wire 56 which connects with the contact arm 42. The brushes 40 and 41 are connected by means of the lead wires 57 and 58 to their respective terminals of the motor 47. The neutral lead wire 55 is connected by a wire 59 to one pole 60 of the switch 53 and the pole 61 is connected by the wire 62 to the wire 58. The wire 59 has interposed therein a spring-actuated switch 49 adapted to be opened by a contact with the arm 48.

The operation of this form of the device is as follows: Assuming that the pointer 39 has been set for a desired air flow and the actual amount of air flowing through the duct 10 is less than the desired amount, the damper 11 will naturally fall carrying with it the arm 42, closing the circuit through the wire 57 and causing the motor 47 to run in a damper-opening direction—that is, to move the damper 43 toward a horizontal position. A reverse condition will naturally cause the arm 42 to engage the contact 41 and cause current to flow through the wire 58 moving the segment 45 in a closing direction.

If the stoker motor 50 is shut down by operating the switch 53 current will flow through the wires 59 and 62, which will also move the damper 43 in a closing direction until the arm 48 engages the switch 49 and opens same—in other words, leaving the damper 43 in a banking position. In other words, when the stoker 50 is shut down either by the manually operated switch 53 or its equivalent then the lowermost position of pilot damper 11 has no effect on the action of the motor 47, but this motor will continue to operate until the damper 43 is closed; that is, is in a banking position, by reason of the fact that current will flow through the wires 59 and 62 until the switch 49 is opened by the arm 48. When the stoker motor is again operated by a closing of the switch 53 the motor 47 is also operated and the damper 43 is gradually opened, preventing an objectionably severe blast of air from being directed against the coal bed before additional fuel is added thereto and the partly consumed portions have been permitted to burn under the softening influence of the partially closed banking damper. That is if the switch 53 is moved to a position opposite that shown in Fig. 6 the motor 50 will stop, the blower 51 will also stop and the damper 11 will drop sufficiently far to cause the arm 42 to engage the contact 40. Current will then flow from the power line 54 through the switch arm 53 to the contact 61 through the wires 62 and 58 to the motor 47, and thence through the wire 59 and the switch 49 to the contacts 60 to the opposite side of the power line 54.

Figure 7:
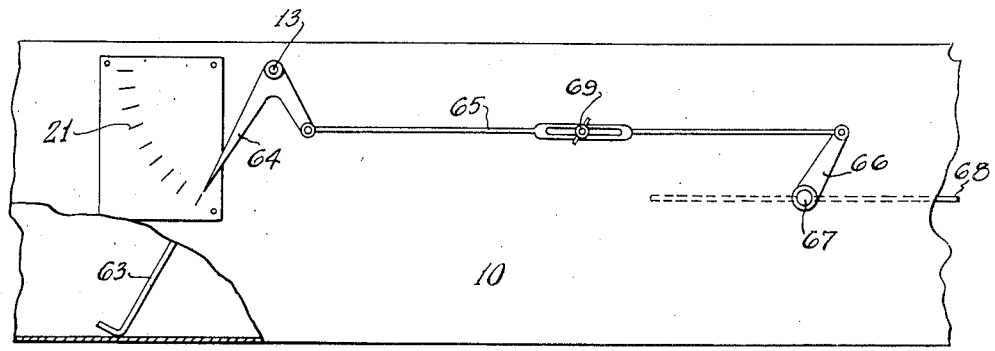
Fig. 7 is a fragmentary view showing a mechanical means for operating the control damper directly from the pilot damper.

In the form of the device shown in Fig. 7 mechanical means are provided for maintaining the relationship between the action of the pilot damper and the controlling damper. In this instance the pilot damper 63 also serves as a banking damper and the indicator 64 is free to move with the damper 63 under the action of the air passing through the duct 10. The arm 64 is joined by an adjustable connecting rod 65 to an arm 66 on the shaft 67 of the balanced damper 68.

In this form of the device the passing air currents operate the damper 63 indicating visibly by means of the arm 64 the amount of air passing through the duct 10, and at the same time adjusting the position of the balanced damper 68 so as to control the amount of restriction offered to the flow of air. In other words, if the flow of air exceeds the desired amount the arm 64 will so indicate and this will cause a corresponding movement of the balanced damper 68 increasing the restriction.

The relationship between the action of the dampers 63 and 68 may be varied by means of the clamping screw 69 on the rod 65.

While there is a seeming difference in the modifications described herein there is a general similarity in that the pilot damper is influenced by the flow of the passing air and the action resulting therefrom is employed to actuate the controlling damper which, in turn, regulates the flow of such air.

I claim:

1. An air flow control for coal burning stokers provided with a fan for supplying air to a furnace and an air duct for delivering air from the fan to the furnace comprising a floating pilot damper mounted within said air duct responsive to air passing therethrough, a balanced regulating damper also mounted in said air duct, a reversible motor for actuating said regulating damper, selectively disposed spaced contacts associated with said pilot damper, a contact arm between said contacts and actuated by said pilot damper, said contacts together with said arm forming a part of the electrical connections to said motor, a switch in the electrical circuit of said motor having an operating connection to said regulating damper whereby the closing of said regulating damper will open said switch and stop the motor thereby holding said regulating damper in a banking position.

2. An air flow pilot control for coal burning stokers comprising in combination a fan, an air duct for delivering air from said fan, a balanced regulating damper in said duct for regulating the flow of air therethrough, a reversible motor for operating said balanced damper, a spring closed switch in the circuit of said motor, an arm operated by said damper adapted to open said switch when the damper is in a closed position, a pilot damper within said duct adapted to float in the air passing said regulating damper, a contact arm operated by said pilot damper, spaced contact points associated with said arm and adapted to be respectively included therewith in circuits for reversing the operation of said motor whereby its direction of rotation will be controlled by said pilot damper to govern the position of the regulating damper, and means for adjusting the setting of said contacts whereby to determine the location of the range of movement of the contact arm and pilot damper.

3. An air flow control device including an air duct, an air responsive vane within said duct movable in proportion to the velocity of air flowing through the duct, a member outside of the duct movable with the vane, air restricting means for decreasing the flow of air through the duct by increasing resistance to the flow of such air and electrical means for moving said air restricting means, said electrical means including spaced contacts in the path of the outside member.

4. In combination with an air duct for supplying air to furnaces; a combined pilot and banking damper movable in proportion to the velocity of air flowing thru the duct and pivoted in said duct in such a manner to substantially close the same for banking purposes upon the rate of air falling to a minimum, a regulating damper for controlling the flow of air from a source of air supply, and located between said source and the banking damper, and adjustable means operatively connecting said dampers for opening said regulating damper as said banking damper moves toward closing position and for moving said regulating damper toward a closing position as the pilot damper approaches a predetermined maximum, said connecting means being adjustable whereby the ratio of the openings of the two dampers may be altered to suit conditions.

5. The combination of claim 4 in which said connecting means includes a reversible motor for operating the regulating damper.

6. An air flow control system for a furnace air supply duct comprising means for adjustably restricting the passageway thru said duct whereby to regulate the velocity of the air current therethru from a given supply, an air current responsive means, members operatively connecting said means so that the air current responsive means controls the operation of the restricting means, said members including a device for setting said current responsive means to operate at any predetermined rate of air flow whereby to hold the restricting means at a position to permit said rate of air flow, one of said means being adapted to close said duct upon the air flow dropping to a minimum, said passageway restricting means comprising a balanced damper, and said members including a reversible motor for operating the balanced damper, and electrical connections between the air current responsive means and the motor whereby during air flow the latter maintains the damper at any predetermined position.

7. An air flow control for a furnace air supply duct comprising a damper for controlling the rate of air flow, a reversible motor for operating said damper, a pilot damper in said duct responsive to the velocity of the air current, electrical circuits for controlling the direction of operation of said motor, and means operated by the pilot damper for respectively closing said circuits in response to increase or decrease of air flow.

8. The control of claim 7 in which said means includes a contact arm, connected to be moved by the pilot damper over a limited range, and selectively disposed means for determining the position of said range with respect to the position of the pilot damper for any given air current.

9. The control of claim 7 in which said means includes a pivoted contact arm connected to be moved by the pilot damper over a limited sector, a pair of relatively fixed contacts for determining the angle of said sector and adjustable means for mounting said contacts at any desired position about the pivot of said arm to thereby determine the position of the sector with respect to the position of the pilot damper for any given air current.

10. An air flow control for an air duct comprising electrically controlled means for determining the velocity of air flow thru said duct, a pilot damper pivoted in said duct, a contact arm connected to be moved by the pilot damper over a scale commensurate with the full range of movement of the pilot damper, an indicator member adjustably mounted and adapted to be fixed at any position along said scale, a pair of spaced contacts carried by the indicator member for spanning said contact arm to selectively determine the portion of the scale over which the contact arm may move and thereby to determine the corresponding portion of the range over which the pilot damper may move, said contact arm and said contact being included in the electric control whereby the velocity of air flow is determined by the selected position of the indicator member.

11. The control of claim 10 in which said indicator member is a hollow arm and covers said contact arm and is pivoted to be moved over substantially the same arc as the contact arm, said contacts adapted to lie on either side of said contact arm so as to be alternately engaged thereby as the arm moves back and forth over its sector in response to movement of the pilot damper.

12. The control of claim 10 in which said pilot damper is sufficiently large to substantially close said air duct and which is adapted to assume its closing position upon the dropping of the air flow, to a predetermined rate.

13. In an air flow control for the air supply duct for furnaces: the combination of a pilot damper and an indicator member, said damper and member being relatively movable and having corresponding ranges of movement, means for setting said member at any position in its own range of movement, and means on said member for limiting the movement of the damper to a portion of its full range.

14. The combination of claim 13 in which the damper and member are coaxially pivoted and adapted to move over sectors of substantially the same number of degrees.

15. In combination: an air duct for conducting air to a furnace, a banking damper pivoted in said duct in a manner to close the same upon the air flow falling to a predetermined minimum, a graduated scale adjacent the pivotal axis of said damper, an indicator member pivoted coaxial with the damper and adapted to move over said scale to fix and indicate the maximum opening of the damper, said member being of hollow sector form and pivoted at its apex, a contact arm on said damper adapted to be moved thereby over a sector determined by the position of said member, a contact on said member adapted to engage said arm for determining the maximum opening of the damper, a second contact on said member for engagement with said arm for determining the minimum opening of the damper, said second contact being spaced from the first and adapted to engage the contact arm from a point just short of the first contact thru the rest of the arm travel, an electrically controlled regulating damper for controlling the air flow thru the duct, means including a circuit containing the contact arm and the first contact and adapted when closed to cause the regulating damper to move toward closing position, said means also including a circuit containing the contact arm and said second contact and adapted when closed to cause the regulating damper to move toward open position, and means for setting said member at any position on said scale to permit the air flow indicated thereby.

16. An air flow control system for a furnace air supply duct comprising a combined regulating and banking damper therein, a reversible motor for controlling the position of said damper, a normally open circuit including said motor and adapted when closed to cause the motor to close said damper, a normally closed circuit including said motor and adapted when closed to cause the motor to open said damper, a floating pilot damper pivoted in said duct and adapted to open said closed circuit and to close said normally open circuit under the action of an air current of a predetermined velocity thereby to cause the regulating damper to move in a direction to reduce the velocity, said pilot damper normally tending to maintain said normally closed circuit whereby upon reduction of air current the regulating damper is moved toward its position of maximum opening, an electric fan motor for propelling air thru said duct, a switch for simultaneously opening the fan motor circuit and the normally closed circuit and for at the same time closing the normally open circuit whereby to cause the regulating damper to move to closing or banking position, and means operated by said regulating damper in its banking position to open the last closed circuit.

MAX C. RICHARDSON.